United States Patent
Starzinger et al.

(10) Patent No.: US 10,811,996 B2
(45) Date of Patent: Oct. 20, 2020

(54) METHOD FOR OPERATING AN INVERTER, AND INVERTER

(71) Applicant: Fronius International GmbH, Pettenbach (AT)

(72) Inventors: Johannes Starzinger, Pettenbach (AT); Martin Nagelmueller, Pettenbach (AT)

(73) Assignee: Fronius Internationla GmbH, Pettenbach (AT)

( * ) Notice: Subject to any disclaimer, the term of this patent is extended or adjusted under 35 U.S.C. 154(b) by 0 days.

(21) Appl. No.: 16/337,547

(22) PCT Filed: Sep. 29, 2017

(86) PCT No.: PCT/EP2017/074760
§ 371 (c)(1),
(2) Date: Mar. 28, 2019

(87) PCT Pub. No.: WO2018/060414
PCT Pub. Date: Apr. 5, 2018

(65) Prior Publication Data
US 2020/0036298 A1 Jan. 30, 2020

(30) Foreign Application Priority Data

Sep. 30, 2016 (EP) ..................................... 16191753

(51) Int. Cl.
*H02M 7/49* (2007.01)
*H02M 7/5387* (2007.01)
*H02M 7/493* (2007.01)

(52) U.S. Cl.
CPC ......... *H02M 7/53871* (2013.01); *H02M 7/49* (2013.01); *H02M 7/493* (2013.01)

(58) Field of Classification Search
CPC .... H02M 7/53871; H02M 7/49; H02M 7/493; H02M 7/5395; H02M 7/5387
See application file for complete search history.

(56) References Cited

U.S. PATENT DOCUMENTS 5,574,636 A * 11/1996 Lee ..................... H02M 5/4585
363/132
9,853,591 B2 12/2017 Saha et al.
(Continued)

FOREIGN PATENT DOCUMENTS

DE  10 2007 046 511 A1  4/2009
EP     2009-165279 A    7/2009
(Continued)

OTHER PUBLICATIONS

English translation of International Preliminary Report regarding Patentability in PCT/EP2017/074760, dated Nov. 20, 2018.
(Continued)

*Primary Examiner* — Pinping Sun
(74) *Attorney, Agent, or Firm* — Collard & Roe, P.C.

(57) ABSTRACT

The invention relates to a method for operating an inverter (1) and to an inverter (1) for converting a direct voltage ($U_{DC}$) into an alternating voltage ($U_{AC}$) with a specified grid frequency ($f_{AC}$) for supplying loads (12) and/or feeding into a supply grid (13), comprising a direct voltage input (2) and multiple AC power units (6) which are connected in parallel and comprise semiconductor switches (7) in a bridge circuit and freewheeling diodes (8) arranged parallel thereto. The outputs of the AC power units (6) are connected to an alternating voltage output (10) via a respective inductivity (9). A common controller (11) is provided for synchronously controlling the semiconductor switches (7) of the AC power units (6) connected in parallel with a switching frequency ($f_S$) in order to prevent imbalances between the parallel AC power units (6), said controller (11) being designed to block the semiconductor switches (7) of the AC power units (6) during individual zero crossings of the output alternating current ($I_{AC}$) over a specified duration ($t_F$) such that the inductivities (9) can be discharged via the freewheeling diodes (8) of the semiconductor switches (7) and the sub-
(Continued)

Figure 1:
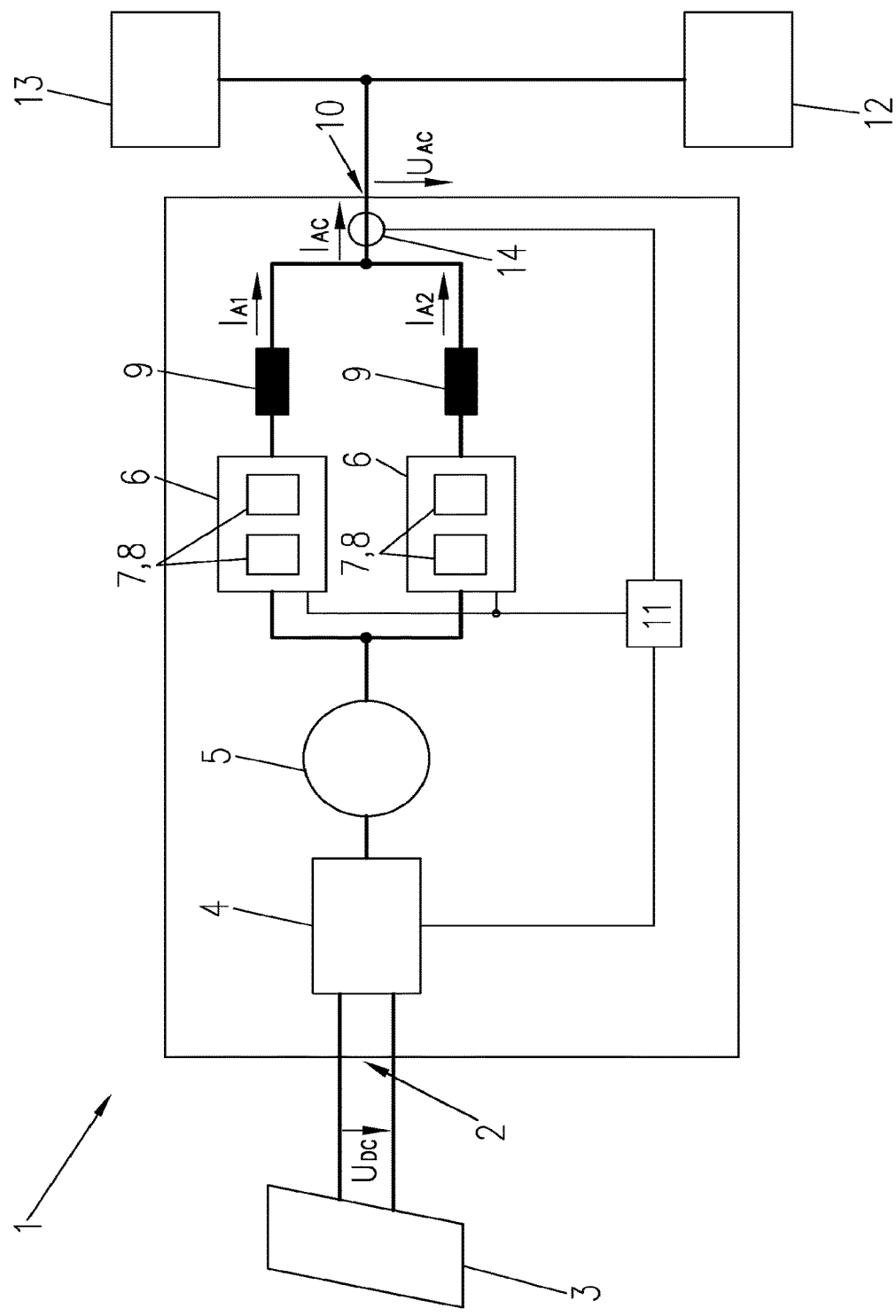

output currents ($I_{Ai}$) of the parallel AC power units (6) can thus be balanced.

14 Claims, 8 Drawing Sheets

(56) References Cited

U.S. PATENT DOCUMENTS

| | | | | |
|---|---|---|---|---|
| 2005/0180175 | A1* | 8/2005 | Torrey | H02M 3/335 363/17 |
| 2010/0315152 | A1* | 12/2010 | Zhang | H02M 3/158 327/434 |
| 2013/0336028 | A1* | 12/2013 | Kawamura | H02M 7/066 363/53 |
| 2014/0119060 | A1* | 5/2014 | Zhu | H02M 3/337 363/17 |
| 2014/0268932 | A1* | 9/2014 | Gupta | H02M 7/493 363/40 |
| 2016/0308457 | A1* | 10/2016 | Yuzurihara | H02M 1/34 |
| 2016/0329705 | A1* | 11/2016 | Lacaux | H02M 1/44 |
| 2016/0359415 | A1* | 12/2016 | Friebe | H02M 7/53871 |
| 2018/0152118 | A1* | 5/2018 | Friebe | H02M 1/44 |

FOREIGN PATENT DOCUMENTS

| | | |
|---|---|---|
| EP | 2 887 519 A2 | 6/2015 |
| WO | 2009/003959 A2 | 1/2009 |
| WO | 2015/152002 A1 | 4/2017 |

OTHER PUBLICATIONS

Suo Ji, "Control of Circulating Current for Direct Parallel Grid-Connected Inverters in Photovoltaic Power Generation" 2009 International Conference on Mechatronics and Automation, Aug. 12, 2009, pp. 3805-3811.

International Search Report in PCT/EP2017/074760, dated Feb. 7, 2018.

Extended European Search Report in EP 16191753.9-1809, dated Apr. 10, 2017, with English translation of relevant parts.

Written Report of International Search Authority in PCT/EP2017/074760, dated Feb. 7, 2018, with English translation of relevant parts.

Letter to European Patent Office from European Attorney Sonn & Partner regarding PCT/EP2017/074760, dated Oct. 12, 2018, with English translation of relevant parts.

International Preliminary Report regarding Patentability in PCT/EP2017/074760, dated Nov. 20, 2018, with English translation of relevant parts.

* cited by examiner

Fig.6
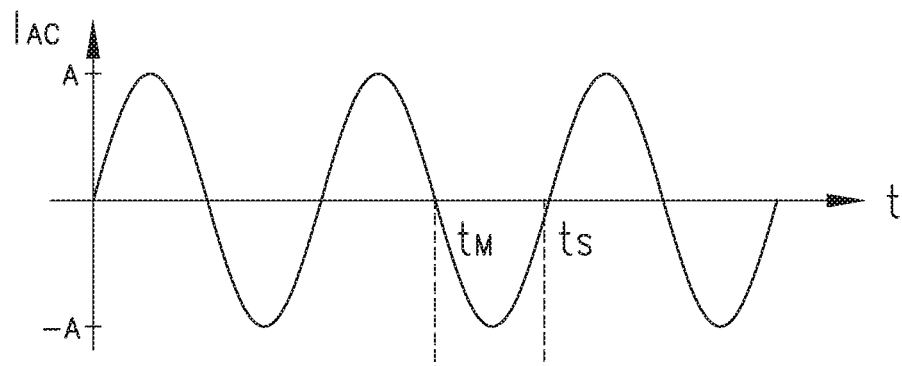
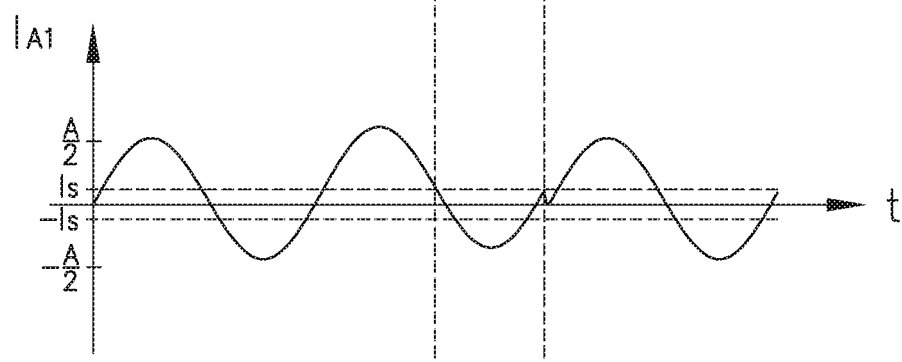
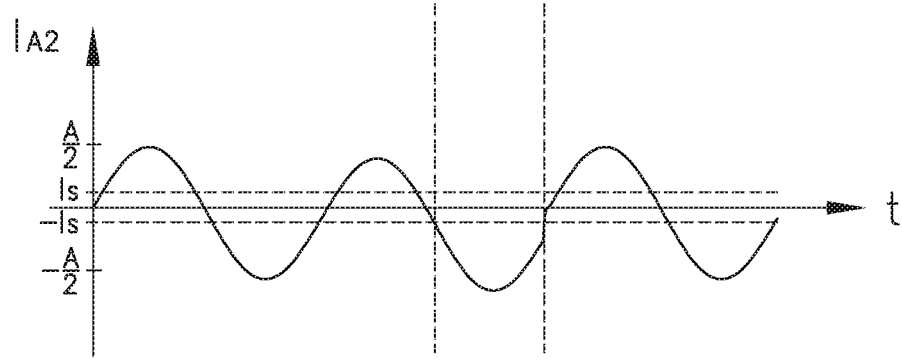

METHOD FOR OPERATING AN INVERTER, AND INVERTER

CROSS REFERENCE TO RELATED APPLICATIONS

This application is the National Stage of PCT/EP2017/074760 filed on Sep. 29, 2017, which claims priority under 35 U.S.C. § 119 of European Application No. 16191753.9 filed on Sep. 30, 2016, the disclosure of which is incorporated by reference. The international application under PCT article 21(2) was not published in English.

The invention relates to a method for operating an inverter for converting a direct voltage into an alternating voltage with a specified grid frequency for supplying loads and/or feeding into a supply grid, wherein the direct voltage is supplied via a direct voltage input to multiple AC power units which are connected in parallel and comprise semiconductor switches in a bridge circuit and freewheeling diodes arranged parallel thereto, and the sub-output currents of the individual AC power units are supplied to an alternating voltage output in the form of an output alternating current via a respective inductivity.

The invention relates further to an inverter for converting a direct voltage into an alternating voltage with a specified grid frequency for supplying loads and/or feeding into a supply grid, comprising a direct voltage input and multiple AC power units which are connected in parallel and comprise semiconductor switches in a bridge circuit and freewheeling diodes arranged parallel thereto, wherein the outputs of the AC power units are connected to an alternating voltage output via a respective inductivity.

WO 2009/003959 A2 illustrates an inverter system in which parallel AC power units which are designed as inverters are operated at a common direct voltage input or direct voltage intermediate circuit. The inverters are constructed with semiconductor switches in a bridge circuit, and some possible embodiments for half bridges are indicated. The parallel AC power units are connected via inductivities and thus form the alternating current output for supplying loads. The current flow to the load is conducted via semiconductor switches whose controlling takes place with a controller. The problems of the current flow between the parallel AC power units due to differences in impedance and different switching behavior of the AC power units and/or their semiconductor switches is described, which is also called cross current or circulating current and causes imbalances in the distribution of the entire output alternating current to the sub-output current of the individual, parallel AC power units. This may, in further consequence, cause thermal losses in the AC power units, overloading of the semiconductor switches, and idle power intake of the entire system. WO 2009/003959 A2 and/or its state of the art describe methods for avoiding these undesired effects due to the circulating currents and/or for balancing the output alternating current, i.e. for achieving a balanced current distribution of the output alternating current to the individual parallel AC power units. All these methods, however, have in common that, for reducing the circulating currents, the imbalance of the output alternating current distribution has to be measured with a relatively high effort and an additional superordinate controll is required.

EP 2 887 519 A2 describes a power supply for aircraft with multiple parallel output units, wherein, for reducing high-frequency circulating currents, inductivities are used for limiting the circulating currents. For the reduction of low-frequency circulating currents a control is additionally proposed, which requires additional circuit complexity.

DE 10 2007 046 511 A1 discloses a rectifier with multiple parallel circuits for use in drive engineering, which comprises, for avoiding circulating currents within a parallel circuit, a switch for the short-time interruption of the parallel circuit. Circulating currents and imbalances occurring between the parallel circuits cannot be reduced thereby.

The object of the present invention consists in providing an above-mentioned method and an inverter in which, despite parallel AC power units, imbalances are preferably avoided and a control for reducing the circulating currents can be waived. Additional components for reducing the circulating currents are to be preferably avoided.

The object of the invention is solved by an above-mentioned method for operating an inverter in which the semiconductor switches of the AC power units which are connected in parallel are controlled by a common controller synchronously with a switching frequency and the semiconductor switches of the AC power units are blocked during individual zero crossings of the output alternating current over a specified duration such that the inductivities are discharged via the freewheeling diodes of the semiconductor switches and the sub-output currents of the parallel AC power units are thus balanced. With the individual zero crossings of the output alternating current the individual sub-output currents of the parallel AC power units would, in the case of a balanced distribution of the output alternating current, also be in the region of the zero crossing. Possibly available sub-output currents of the individual AC power units are therefore caused by imbalances and/or circulating currents and may decay with a blocked semiconductor switch of the AC power units via the freewheeling diodes of the semiconductor switches. Due to the energy stored in the inductivities, however, the circulating currents take a particular time to decay. Depending on the magnitude of the imbalance the sub-output currents may decay to zero or may at least be reduced during the specified duration in which the semiconductor switches are blocked. Imbalances in the current distribution to the parallel AC power units which build up over a lengthy duration can thus be avoided efficiently. By blocking the semiconductor switches of the AC power units during individual zero crossings of the output alternating current over a specified duration, the circulating current occurring in the sub-output currents of the parallel AC power units can be reduced and thus a balanced current distribution of the output alternating current to the individual sub-output currents of the parallel AC power units can be achieved. Imbalances in the power distribution to the individual AC power units which have possibly been produced during the provision of the output alternating current can thus be reset. By blocking the semiconductor switches of the AC power units during individual zero crossings of the output alternating current the circulating current occurring in the sub-output currents of the parallel AC power units can be reduced in that the sub-output currents decay via the freewheeling diodes, and after the termination of the balancing and/or with the re-starting control of the semiconductor switches the output alternating current can distribute evenly to the individual sub-output currents of the parallel AC power units. This may allow to operate multiple parallel AC power units, wherein a superordinate, additional control for reducing the circulating currents can be waived. Moreover, no additional components are required with the method in accordance with the invention.

As a bridge circuit of the AC power units both half bridges and full bridges in different embodiments, such as, for instance, 2-point or 3-point bridges, may be used.

The method is characterized by particular simplicity since the functionally equal semiconductor switches of the AC power units which are connected in parallel are controlled synchronously by the common controller. This allows the use of a single controller for all the parallel AC power units. For instance, a single control line may be used for multiple semiconductor switches. The entire system of the parallel AC power units can thus be constructed in a simple and cost-efficient manner.

If the semiconductor switches of the AC power units are blocked during every $n^{th}$ zero crossing of the output alternating current over the specified duration, with n being an odd integer number, especially a prime number, less than 500, the distortions in the output alternating current which are caused by the interruption of the current flow can be reduced. Exactly when using an odd interval of zero crossings for the application of the method it is possible that the effects of the current interruption caused by the method cancel each other out on average with a positive and a negative half-wave. Additionally, by using a prime number as an interval of balancing, a broader distribution of the distortions to the spectrum may be achieved, which may reduce the influence of distortions on the quality of the alternating voltage at the output of the inverter.

An advantageous interval for the application of the method may be determined if the output alternating current is measured and n is varied as a function of the output alternating current. Since the imbalance of the sub-output currents is influenced for a certain part by the intensity of the output alternating current, the output alternating current may be used for determining the interval of balancing, i.e. the blocking of the semiconductor switches. For determining the intensity of the output alternating current its effective value or else its maximum value may be referred to.

The method may be further improved if the sub-output current of each AC power unit and the output alternating current are measured and, if a defined sub-output current of one of the parallel AC power units during zero crossing of the output alternating current is exceeded, the semiconductor switches of the parallel AC output units are blocked over the specified duration. The maximum intensity of the individual sub-output currents of the parallel AC power units during zero crossing of the output alternating current may be used as a measure of the effective imbalance since in the case of perfect balance all sub-output currents during zero crossing of the output alternating current would be zero. Accordingly, depending on the maximum intensity of the individual sub-output currents of the parallel AC power units during zero crossing of the output alternating current, the necessity of balancing can be determined and the latter may be performed subsequently and/or possibly also during the next zero crossing of the output alternating current only.

It is certainly not stringently necessary to measure the sub-output currents of each AC power unit and the output alternating current since, in correspondence with Kirchhoff's junction rule, one of the currents, with a measurement of all the residual currents, can also be calculated.

In a further possible variant of the method the sub-output current of each AC power unit and the output alternating current are measured and the specified duration is selected as a function of the largest sub-output current of the parallel AC power units during zero crossing of the output alternating current. The balancing duration may be selected by means of the specified duration such that, toward the end of balancing, the individual sub-output currents of the parallel AC power units are zero. It is likewise conceivable to adapt the specified duration dynamically such that the balancing ends with the undercutting of a defined, maximum intensity of the individual sub-output currents of the parallel AC power units. In this method the balancing duration is also varied instead of and/or additionally to the balancing frequency. This may possibly effect shorter balancing and thus less distortions in the signal course of the output alternating voltage.

If the specified duration is varied preferably stochastically within specified limits, the distortions in the frequency spectrum of the output alternating current can be reduced further.

A variant of the method which is easy to implement results if the specified duration is selected as one period of the switching frequency. The specified duration may thus lie in the range of some few micro seconds to several 100 micro seconds, preferably between 5 and 100 micro seconds.

The object according to the invention is also solved by an above-described inverter in which a common controller is provided for synchronously controlling the semiconductor switches of the AC power units connected in parallel with a switching frequency, said controller being designed to block the semiconductor switches of the AC power units during individual zero crossings of the output alternating current over a specified duration such that the inductivities can be discharged via the freewheeling diodes of the semiconductor switches and the sub-output currents of the parallel AC power units can thus be balanced. As to the advantages achievable therewith, reference is made to the above description of the method.

The controller may be designed to block the semiconductor switches of the parallel AC power units during every $n^{th}$ zero crossing of the output alternating current over the specified duration, wherein n is an odd integer number, especially a prime number, less than 500.

A sensor for measuring the sub-output current may be arranged at the alternating power output and may be connected with the controller such that that the controlling of the semiconductor switches may be performed as a function of the output alternating current.

A sensor for measuring the sub-output current of the AC power unit may be arranged at each AC power unit and may be connected with the controller.

The controller may be designed for the preferably stochastic variation of the specified duration within specified limits.

In a simple embodiment the specified duration may be one period of the switching frequency.

The AC power units may be formed by half bridges with at least two semiconductor switches each, preferably IGBTs with integrated freewheeling diodes.

In another embodiment the AC power units may be formed by full bridges with at least four semiconductor switches each, preferably IGBTs with integrated freewheeling diodes.

The controller may comprise a pulse width modulator for controlling the semiconductor switches.

Figure 2:
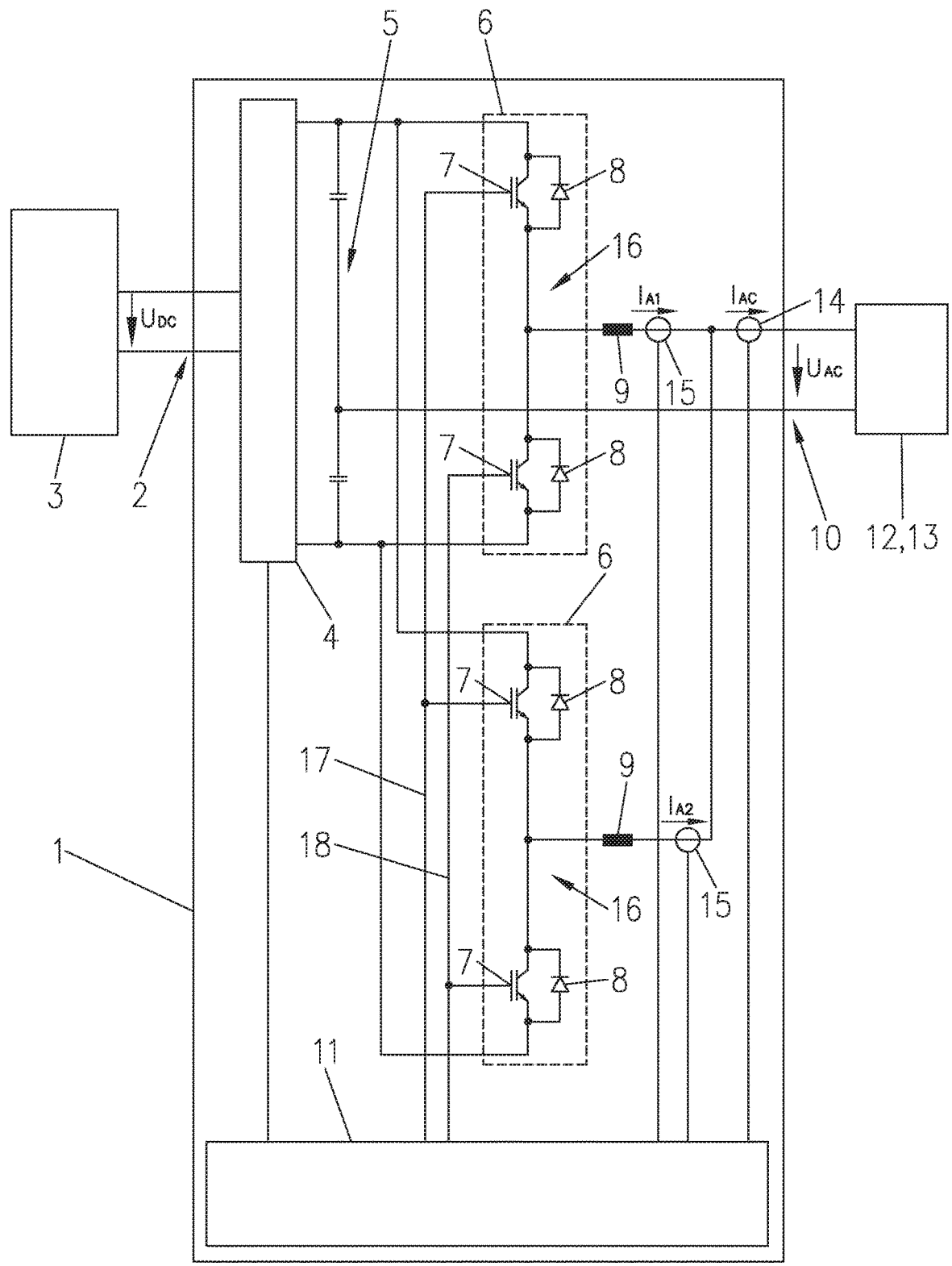
Figure 3:
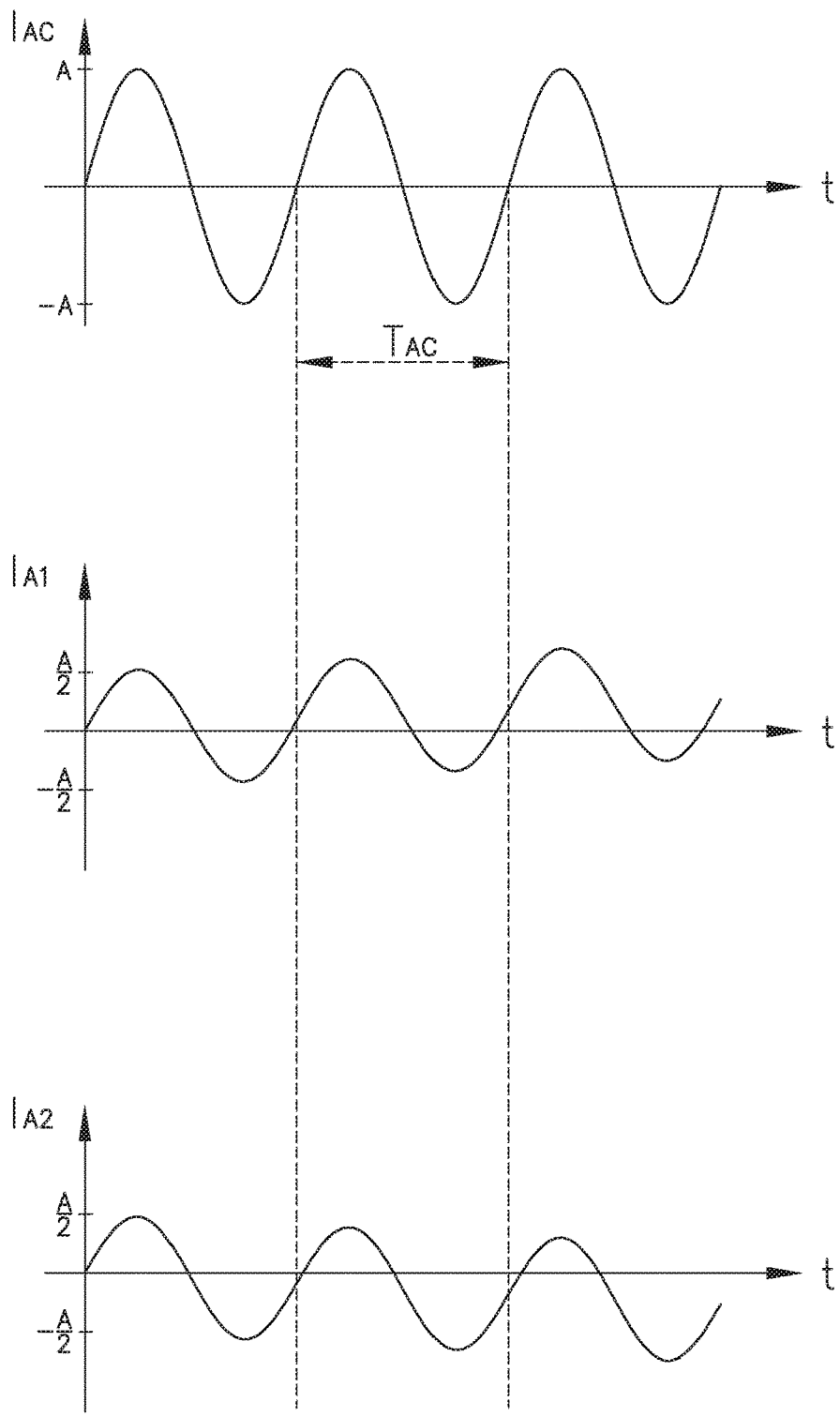
Figure 4:
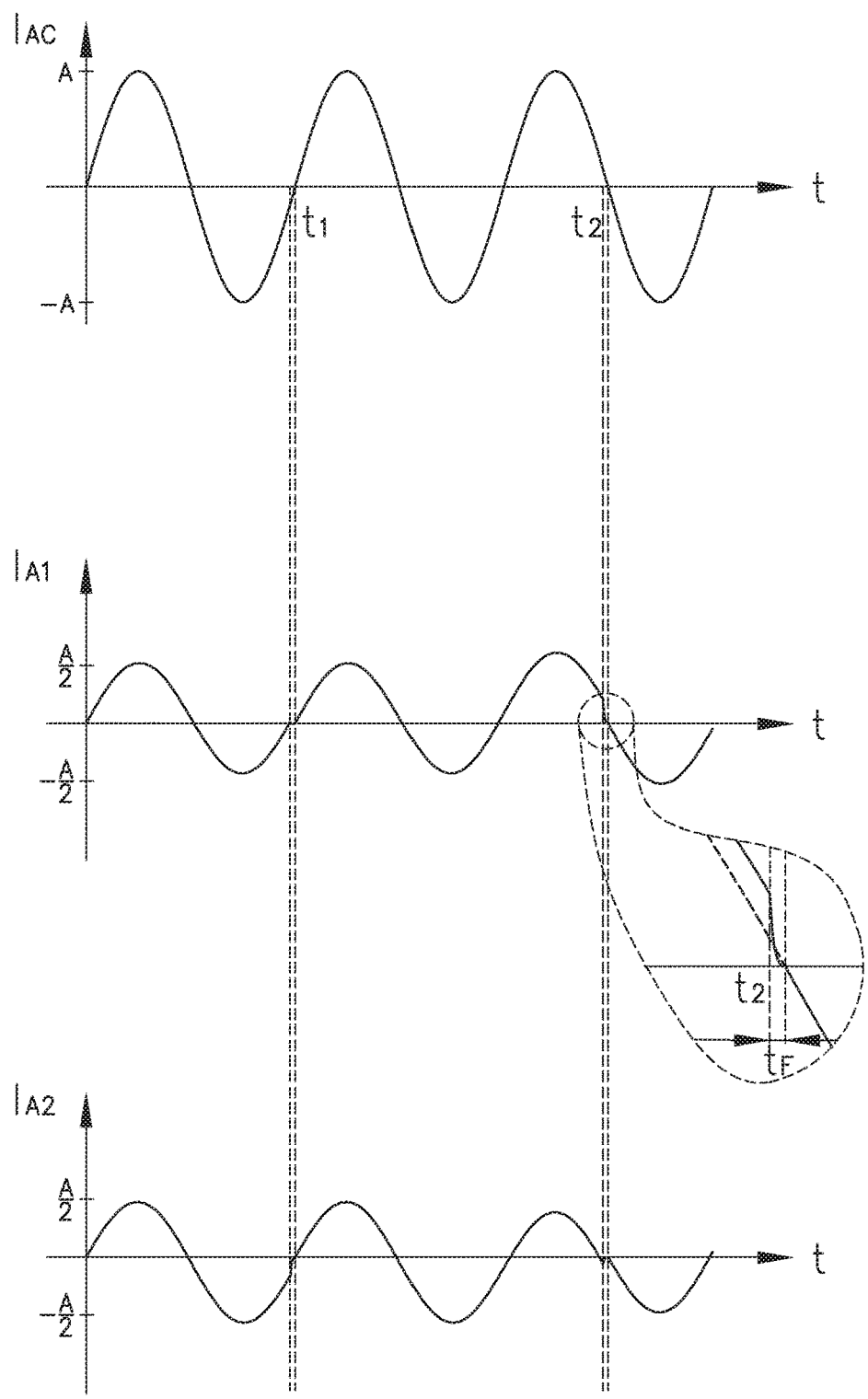
Figure 5:
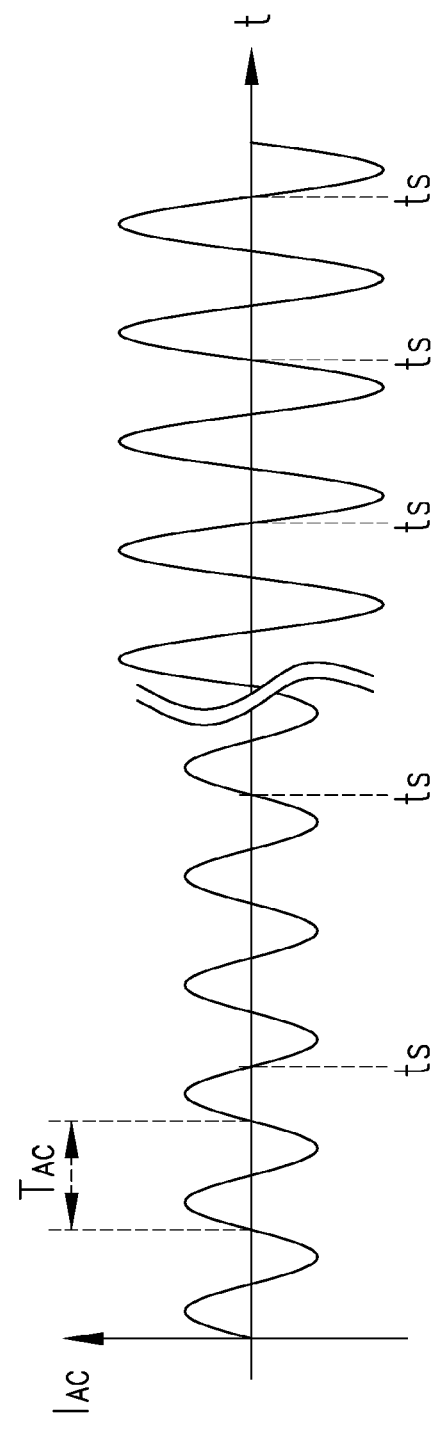
Figure 7:
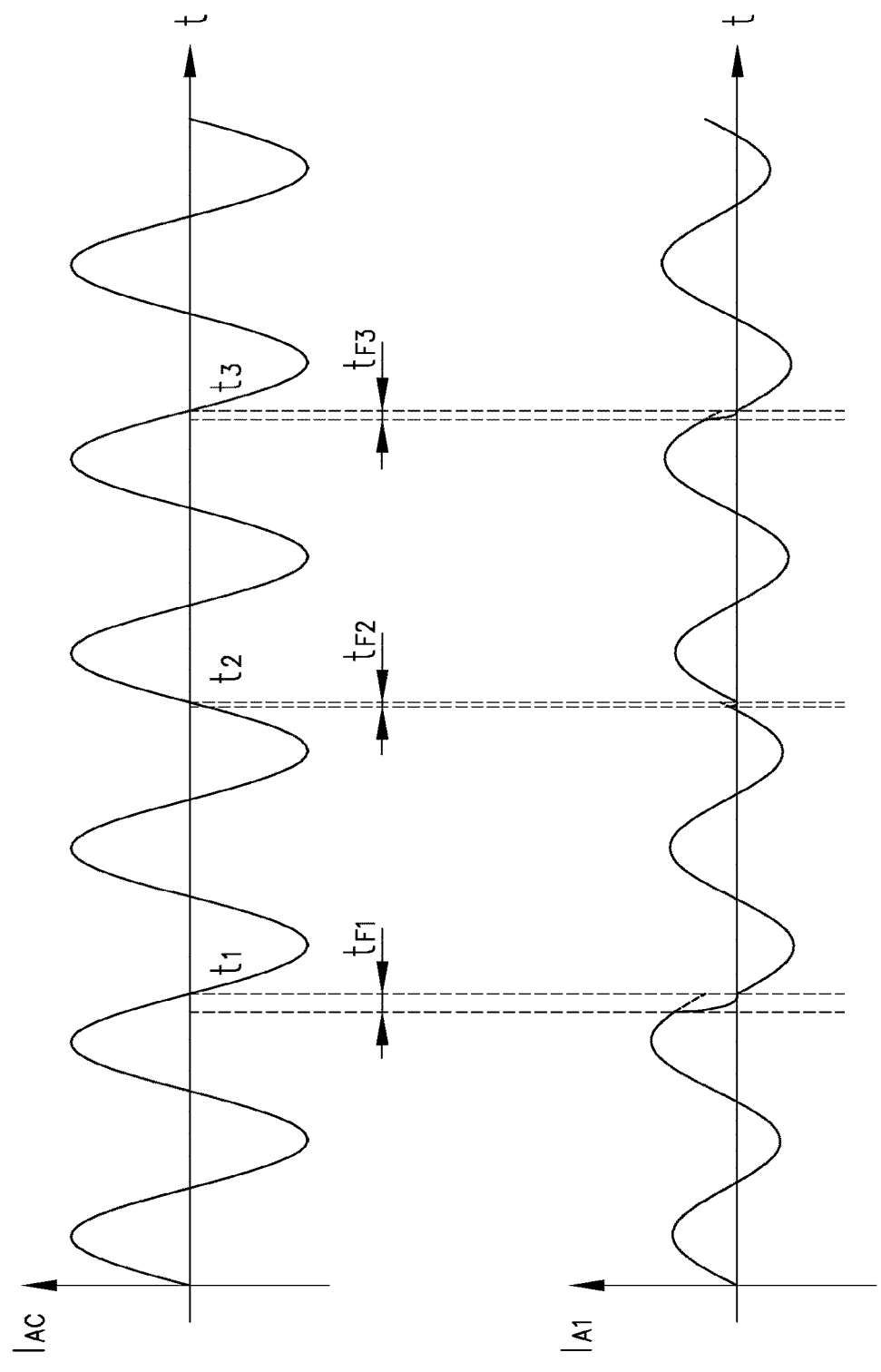
Figure 8:
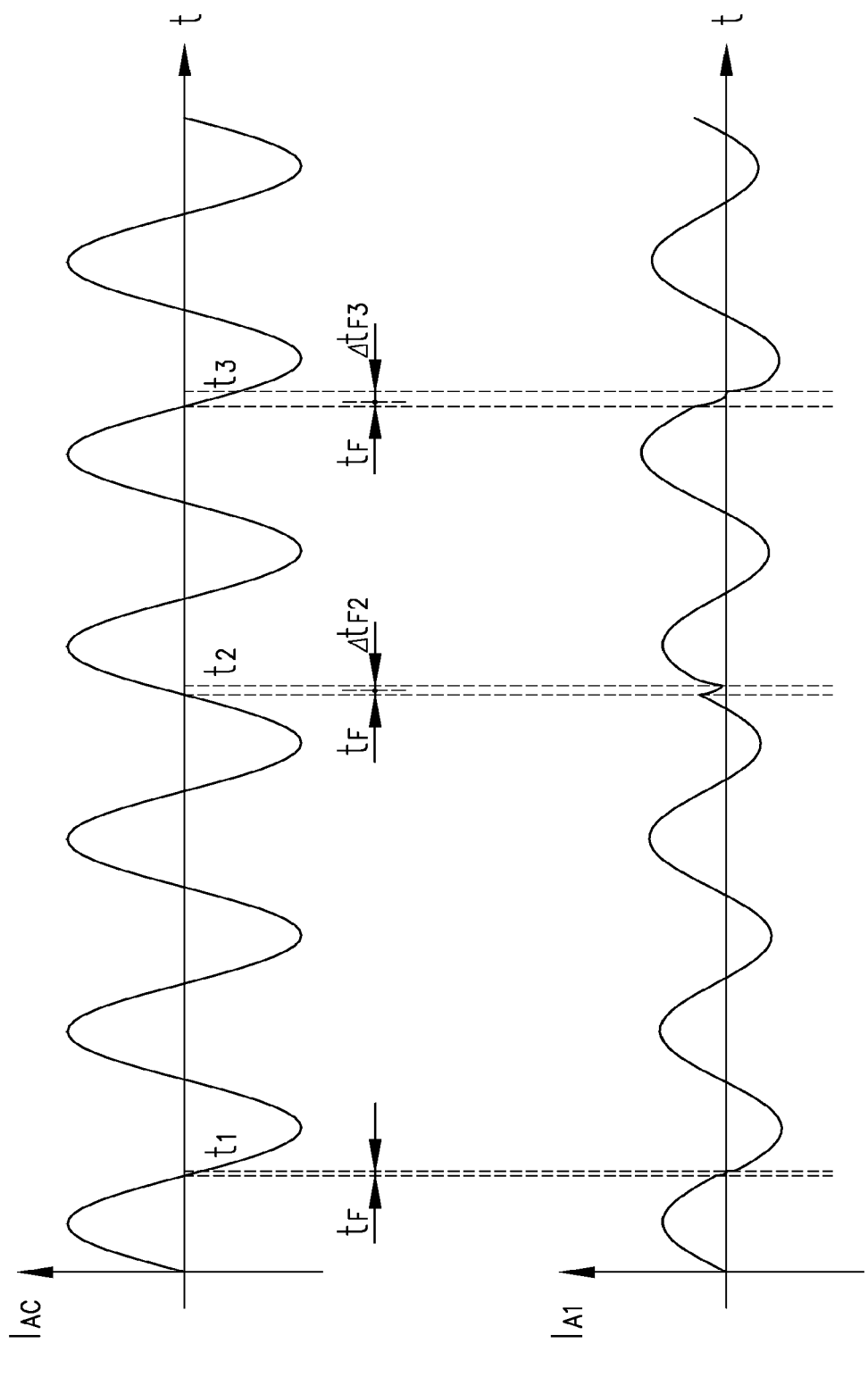

The invention will be explained in detail by means of the enclosed drawings. There show:

FIG. 1 a schematic overview of an inverter with multiple parallel AC power units;

FIG. 2 a possible embodiment of the inverter according to the invention with multiple parallel AC power units;

FIG. 3 the chronological sequence of the output alternating current and of the sub-output currents of the AC power units without the application of the method according to the invention;

FIG. 4 the chronological sequence of the output alternating current and of the sub-output currents of the AC power units with the application of the method according to the invention;

FIG. 5 the chronological sequence of the application of the method according to the invention with differing output alternating current;

FIG. 6 the chronological sequence of the output alternating current and of the sub-output currents of the AC power units with the use of a threshold value for the sub-output current for the application of the method according to the invention;

FIG. 7 the application of the method according to the invention in which the specified duration is selected as a function of the intensity of the sub-output current during zero crossing of the output alternating current; and FIG. 8 the method according to the invention with a stochastic variation of the specified duration.

FIG. 1 illustrates a schematic overview of an inverter 1 as it is used, for instance, for photovoltaic systems. The inverter 1 is connected at its direct voltage input 2 with an appropriate direct voltage source 3, for instance, a battery or photovoltaic modules. An input DC converter 4 which is not described in detail may be arranged optionally before the intermediate circuit 5. The intermediate circuit 5 buffers the direct voltage $U_{DC}$ for the AC power units 6 which are connected in parallel. In this embodiment two parallel AC power units 6 are illustrated, but the method according to the invention is applicable for any number of parallel AC power units 6. The AC power units 6 are constructed with semiconductor switches 7 in a bridge circuit and with freewheeling diodes 8 arranged in parallel thereto (see FIG. 2). With a common controller 11 of the inverter 1, which is preferably formed by a microprocessor, microcontroller or computer, the AC power units 6 and/or their semiconductor switches 7 are controlled with a switching frequency $f_S$. For the controlling of the individual semiconductor switches 7 driver stages, for instance, gate drivers which are not illustrated in detail may be provided. By means of a pulse width modulation the AC power units 6 are, for instance, controlled such that the desired output alternating current $I_{AC}$ is generated as the sum of the individual sub-output currents $I_{A1}$, $I_{A2}$. Moreover, operating elements and interfaces which are not illustrated in detail may be connected with the controller 11, via which an operation of the inverter 1 or a software update of the controller 11 may be performed. The sub-output currents $I_{A1}$, $I_{A2}$ of the individual AC power units 6 are supplied to an alternating current output 10 via a respective inductivity 9. The inductivity 9 may be implemented by a throttle or else by the power inductivities of the connection lines. The output alternating current $I_{AC}$ guided over the alternating current output 10 has a specified grid frequency $f_{AC}$ and is used for the supply of loads 12 and/or for feeding into a supply grid 13 with the alternating voltage $U_{AC}$.

FIG. 2 illustrates a possible embodiment of an inverter 1 in which the individual semiconductor switches 7 inclusive of the parallel freewheeling diodes 8 of the AC power units 6 may be gathered. The semiconductor switches 7 are controlled by the controller 11 with the switching frequency $f_S$. The AC power units 6 comprise 2-point half bridges 16 which are connected in parallel via inductivities 9. In operation, usually always one of the two semiconductor switches 7 of a half bridge 16 is conductive, so that the alternating current output 10 is either connected with the positive or the negative intermediate circuit potential. In analogy, the use of a different bridge circuit topology, for instance, a 3-point half bridge, is certainly also conceivable.

In the case of inverters 1 of this kind the output alternating current $I_{AC}$, due to flow voltage differences, the transmittance properties, and/or the different dynamic switching behavior of the AC power units 6 and/or their semiconductor switches 7, does not distribute evenly between the parallel AC power units 6. Rather, drifting apart of the sub-output currents $I_{A1}$, $I_{A2}$ of the individual AC power parts 6 may take place in operation. FIG. 3 illustrates a corresponding example of the output alternating current $I_{AC}$ and of the sub-output currents $I_{A1}$, $I_{A2}$ in two AC power units 6 which are connected in parallel. The period duration $T_{AC}$ corresponds to the inverse of the specified grid frequency $f_{AC}$. As may be seen by way of example, the sub-output current $I_{A1}$ of the first AC power unit 6 increases by a continuously increasing direct current proportion while the sub-output current $I_{A2}$ of the second AC power unit 6 decreases by the same direct current proportion. The sum of the sub-output currents $I_{A1}$, $I_{A2}$ of the AC power units 6 results in the output alternating current $I_{AC}$ whose amplitude and frequency remain the same and which is illustrated in the topmost diagram in FIG. 3.

As is illustrated in FIG. 4, the semiconductor switches 7 of the AC power units 6 are blocked simultaneously during individual zero crossings of the output alternating current $I_{AC}$ over a specified duration $t_F$ so as to achieve a balanced current distribution of the output alternating current $I_{AC}$ and/or to reduce the imbalance in distribution. In this specified duration $t_F$ the inductivities 9 are discharged via the freewheeling diodes 8 of the semiconductor switches 7 and the sub-output currents $I_{A1}$, $I_{A2}$ of the parallel AC power units 6 are thus balanced. In the illustrated embodiment pursuant to FIG. 4 this balancing takes place after two half waves at the point in time $t_1$ and after three further half waves at the point in time $t_2$. In the enlarged detail section of FIG. 4 the sub-output current $I_{A1}$ of the first AC power unit 6 is illustrated around the point in time $t_2$. The balancedly distributed output alternating current $\bar{I}_{AC}$, in this example half the output alternating current $I_{AC}$, is shown in dashed line. This corresponds actually to the desired sub-output current $I_{A1}$ of the AC power unit 6. Due to imbalances of the electronic components and due to the switching behavior of the semiconductor switches 7 the output currents $I_{A1}$, $I_{A2}$ have a deviation from the desired course, wherein this deviation usually builds up over multiple half waves. Therefore, the semiconductor switches 7 are blocked simultaneously by the controller 11 for the duration $t_F$ prior to the zero crossing of the output alternating current $I_{AC}$. During this duration $t_F$ the sub-output currents $I_{A1}$, $I_{A2}$ may decay to zero via the freewheeling diodes 8 as a function of their effective intensity, but at any rate the sub-output currents $I_{A1}$, $I_{A2}$ and thus the imbalance of the current distribution are reduced. With the end of the duration $t_F$, which coincides in the illustrated example with the zero crossing of the output alternating current $I_{AC}$, the semiconductor switches 7 are controlled again. The output alternating current $I_{AC}$ required after the zero crossing is now, since both AC power units 6 were currentless before, transmitted in a balancedly distributed manner via the half bridges 16 of the AC power units 6 to the alternating voltage output 10 of the inverter 1. Deviating from the illustrated example it is also conceivable to start the duration $t_F$ with the zero crossing of the output alternating current $I_{AC}$, or else that the duration $t_F$ includes the zero crossing of the output alternating current $I_{AC}$.

Although only a single-phase example is illustrated here, the concept may be used equally with three-phase inverters with AC power units 6 which are connected in parallel.

A particularly simple construction of the inverter 11 is achieved in that the semiconductor switches 7 of the AC power units 6 which are connected in parallel are controlled synchronously by the common controller 11. The functionally equal semiconductor switches 7 may, as illustrated in FIG. 2, be controlled via common lines 17, 18, but the controlling with separate control lines comprising the same signals is also conceivable.

FIG. 4 moreover illustrates that the distance of time between the applications of the method may be varied, i.e. that the method need not be performed after each half wave or after each period. Rather, it has turned out that, if the method is applied after every $n^{th}$ zero crossing of the output alternating current $I_{AC}$, wherein n is an odd integer number, especially a prime number, less than 500, the distortions in the frequency spectrum of the output alternating current $I_{AC}$ which are caused by the blocking of the semiconductor switches 7 are kept small. Exactly if an odd interval of zero crossings is used for the application of the method, the effects of the interruption of the output alternating current $I_{AC}$ may cancel each other out on average with a positive and a negative half wave and a DC offset may be avoided.

FIG. 5 illustrates how, as a function of the intensity of the output alternating current $I_{AC}$, the interval for the application of the method is varied. In the first section, with a smaller amplitude of the output alternating current $I_{AC}$, the balancing method is applied every fifth half wave at the points in time $t_S$, while in the second section, with a higher amplitude of the output alternating current $I_{AC}$, the method is applied every third half wave at the points in time $t_S$. The frequency of application of the method is thus adapted to the respective requirements.

The sub-output currents $I_{A1}$, $I_{A2}$ of each AC power unit 6 and the output alternating current $I_{AC}$ may be measured with the aid of sensors 14, 15 or comparable devices for current measurement, such as, for instance, current transformers. In the embodiment pursuant to FIG. 2 a sensor 14 for measuring the output alternating current $I_{AC}$ and a sensor 15 each for measuring the sub-output currents $I_{A1}$, $I_{A2}$ are arranged. Due to Kirchhoff's junction rule it is not necessarily required to measure the sub-output currents $I_{A1}$, $I_{A2}$ of each AC power unit 6 and the output alternating current $I_{AC}$ since one of the currents $I_{A1}$, $I_{A2}$ or $I_{AC}$ can, with the measurement of all the remaining currents, also be calculated. The maximum intensity of the individual sub-output currents $I_{A1}$, $I_{A2}$ of the parallel AC power units 6 at the point in time of the zero crossing of the output alternating current $I_{AC}$ constitutes a measure of the effective imbalance, so that the actual existence of an imbalance becomes measurable. Accordingly, the method is only performed if a defined sub-output current $I_{A1}$, $I_{A2}$ of one of the parallel AC power units 6 during zero crossing of the output alternating current $I_{AC}$ is exceeded, and the semiconductor switches 7 of the parallel AC power units 6 are blocked over the specified duration $t_F$. FIG. 6 illustrates the sub-output currents $I_{A1}$, $I_{A2}$ of the parallel AC power units 6 and the sub-output current $I_{A1}$, $I_{A2}$ which is defined as the threshold value $I_S$ and at the exceeding of which the method according to the invention is performed. It may be seen that the threshold value $I_S$ constitutes an amount and that the method is performed both in the case of positive exceeding and in the case of negative undercutting. Since the effective imbalance during zero crossing of the output alternating current $I_{AC}$ is measured at the point in time $t_M$, the method for balancing the sub-output currents $I_{A1}$, $I_{A2}$ is performed, as illustrated in FIG. 6, prior to the next following zero crossing of the output alternating current $I_{AC}$ at the point in time $t_S$. A variant in which the method is performed directly subsequently to the zero crossing of the output alternating current $I_{AC}$ at the point in time $t_M$, which is not illustrated in detail, would also be applicable.

FIG. 7 illustrates by way of example how the specified duration $t_F$ is selected as a function of the largest sub-output current $I_{A1}$, $I_{A2}$ of the parallel AC power units 6 during zero crossing of the output alternating current $I_{AC}$. Only one of the sub-output currents $I_{A1}$ is illustrated for reasons of simplification. In this embodiment the current balancing takes place every $3^{rd}$ half wave. Depending on the intensity of the sub-output current $I_{A1}$ during zero crossing of the output alternating current $I_{AC}$ the specified duration $t_F$ is selected such that the sub-output current $I_{A1}$ decays to zero within the specified duration $t_F$. Accordingly, $t_{F1}$ is larger than $t_{F3}$ which is in turn larger than $t_{F2}$. The duration of application of the method can thus be shortened to the minimally required time, so that distortions in the signal course of the alternating voltage $U_{AC}$ at the alternating current output 10 of the inverter 1 are reduced. The evaluation of the intensity of the sub-output currents $I_{A1}$, $I_{A2}$ during zero crossing of the output alternating current $I_{AC}$ may take place one half wave prior to the actual balancing, or the current course of the sub-output currents $I_{A1}$, $I_{A2}$ is calculated in advance, as indicated by the dashed lines of the current course of the sub-output current $I_{A1}$ in FIG. 7.

FIG. 8 illustrates another exemplary application of the method in which the number of zero crossings between the applications of the method is also varied. Moreover, FIG. 8 illustrates the application of the method directly after zero crossing. Furthermore, a stochastic variation of the specified duration $t_F$ is used here. Thus, at the point in time $t_1$ the method is applied for the specified duration $t_F$. At the points in time $t_2$ and $t_3$, however, the specified duration $t_F$ is increased by $\Delta t_{F2}$ and/or $\Delta t_{F3}$. At the point in time $t_2$ it is moreover recognizable that a fading of the sub-output current $I_{A1}$ to zero is not stringently necessary since a partial fading of the sub-output current $I_{A1}$ also entails an improvement in current balancing already. Meaningfully, an upper limit $\Delta t_F$ is specified for the stochastic variation of the duration $t_F$. This stochastic variation of the duration $t_F$ may contribute to the reduction of distortions in the signal course of the alternating voltage $U_{AC}$ at the alternating voltage output 10 of the inverter 1.

The method is to implement in a particularly simple manner by selecting the specified duration $t_F$ as one period of the switching frequency $f_S$.

It is pointed out that the illustrated chronological sequences are idealized and do not comprise distortions occurring under real conditions. Specifically for the output alternating current $I_{AC}$ an idealized sequence is assumed.

What is claimed is:

1. A method for operating an inverter for converting a direct voltage ($U_{DC}$) into an alternating voltage ($U_{AC}$) with a specified grid frequency ($f_{AC}$) for supplying loads and/or feeding into a supply grid, wherein the direct voltage ($U_{DC}$) is supplied via a direct voltage input to multiple AC power units which are connected in parallel and each of the AC power units comprises semiconductor switches in a bridge circuit and freewheeling diodes, each freewheeling diode arranged parallel with each corresponding semiconductor switch thereto, and sub-output currents ($I_{Ai}$) of each of the AC power units are supplied to an alternating voltage output in a form of an output alternating current ($I_{AC}$) via a respective inductor corresponding to each of the AC power units, wherein the semiconductor switches of the AC power units which are connected in parallel are controlled via a common controller synchronously with a switching frequency ($f_S$), and the semiconductor switches of the AC power units are blocked during individual zero crossings of the output alternating current ($I_{AC}$) over a specified duration ($t_F$) such that the inductors are discharged via the freewheeling diodes of the semiconductor switches and the sub-output current ($I_{Ai}$) of each of the AC power units that are parallel connected thus decays to zero and is balanced.

2. The method according to claim 1, wherein the semiconductor switches of the AC power units are blocked during every $n^{th}$ zero crossing of the output alternating current ($I_{AC}$) over the specified duration ($t_F$), wherein n is an odd integer number less than 500.

3. The method according to claim 1, wherein the sub-output current ($I_{Ai}$) of each of the AC power units and the output alternating current ($I_{Ac}$) are measured and, if a defined sub-output current ($I_{Ai}$) of one of the AC power units during the zero crossing of the output alternating current ($I_{AC}$) is exceeded, the semiconductor switches of the AC output units are blocked over the specified duration ($t_F$).

4. The method according to claim 1, wherein the sub-output current ($I_{Ai}$) of each of the AC power units and the output alternating current ($I_{Ac}$) are measured and the specified duration ($t_F$) is selected as a function of a largest sub-output current ($I_{Ai}$) of the AC power units during the zero crossings of the output alternating current ($I_{Ac}$).

5. The method according to claim 1, wherein the specified duration ($t_F$) is varied stochastically within specified limits ($\Delta t_F$).

6. The method according to claim 1, wherein the specified duration ($t_F$) is selected as one period of the switching frequency ($f_S$).

7. An inverter for converting a direct voltage ($U_{DC}$) into an alternating voltage ($U_{Ac}$) with a specified grid frequency ($f_{Ac}$) for supplying loads and/or feeding into a supply grid, comprising a direct voltage input and multiple AC power units which are connected in parallel and each of the AC power units comprises semiconductor switches in a bridge circuit and freewheeling diodes, each freewheeling diode arranged parallel with each corresponding semiconductor switch, wherein outputs of the AC power units are connected to an alternating voltage output via a respective inductor, wherein a common controller is provided for synchronously controlling the semiconductor switches of the AC power units connected in parallel with a switching frequency ($f_S$), said common controller being designed to block the semiconductor switches of the AC power units during individual zero crossings of the output alternating current ($I_{Ac}$) over a specified duration ($t_F$) such that the inductors are discharged via the freewheeling diodes of the semiconductor switches and a sub-output current ($I_{Ai}$) of each of the AC power units thus decays to zero and is balanced.

8. The inverter according to claim 7, wherein the common controller is designed to block the semiconductor switches of the AC power units during every $n^{th}$ zero crossing of the output alternating current ($I_{Ac}$) over the specified duration ($t_F$), wherein n is an odd integer number less than 500.

9. The inverter according to claim 7, wherein a sensor for measuring the sub-output current ($I_{Ai}$) of each of the AC power units is arranged at each of the AC power units and is connected with the common controller.

10. The inverter according to claim 7, wherein the common controller is designed for stochastic variation of the specified duration ($t_F$) within specified limits ($\Delta t_F$).

11. The inverter according to claim 7, wherein the specified duration ($t_F$) is one period of the switching frequency ($f_S$).

12. The inverter according to claim 7, wherein the AC power units are formed by half bridges with at least two semiconductor switches, which are Insulated Gate Bipolar Transistors (IGBTs) with integrated freewheeling diodes.

13. The inverter according to claim 7, wherein the AC power units are formed by full bridges with at least four semiconductor switches, which are Insulated Gate Bipolar Transistors (IGBTs) with integrated freewheeling diodes.

14. The inverter according to claim 7, wherein the common controller comprises a pulse width modulator.

* * * * *

UNITED STATES PATENT AND TRADEMARK OFFICE
CERTIFICATE OF CORRECTION

PATENT NO. : 10,811,996 B2
APPLICATION NO. : 16/337547
DATED : October 20, 2020
INVENTOR(S) : Starzinger et al.

It is certified that error appears in the above-identified patent and that said Letters Patent is hereby corrected as shown below:

On the Title Page

Column 1, item (73), please change "Fronius Internationla GmbH" to correctly read:
--Fronius International GmbH--.

Signed and Sealed this
Twenty-fourth Day of November, 2020

Andrei Iancu
*Director of the United States Patent and Trademark Office*